Patented Sept. 12, 1944

2,357,861

UNITED STATES PATENT OFFICE 2,357,861

TREATMENT OF SYNTHETIC RUBBER LATEX

Edward A. Willson, Akron, Ohio, assignor to The B. F. Goodrich Company, New York, N. Y., a corporation of New York No Drawing. Application May 29, 1942, Serial No. 445,085

7 Claims. (Cl. 260—84.5)

This invention relates to the treatment of synthetic rubber latex, and to a method for treating synthetic rubber latex to increase the size of the particles of synthetic rubber contained therein without diluting the latex.

I have disclosed in my copending application Serial No. 442,368 filed May 9, 1942, that synthetic rubber latices prepared by the emulsion polymerization of butadienes-1,3 may be treated to increase the particle size of the synthetic rubber in the latex by adding a water-soluble salt of a water-soluble acid thereto in an amount insufficient to irreversibly coagulate the latex. The presence of a high local concentration of salt tends to coagulate the latex, so in commercial operations it is customary to add the salt in the form of a dilute solution rather than to take the precautions necessary to prevent coagulation when concentrated salt solutions are employed. For many purposes, synthetic rubber latex containing 40% or more of rubber is desired. Since it is difficult to prepare synthetic rubber latex containing more than about 40% of latex, and since the latex is considerably diluted by the addition of a dilute salt solution, it has been necessary to concentrate the salt-treated latex to obtain a latex containing 40% by weight of synthetic rubber in the form of particles of the desired size.

It is the principal object of this invention to provide a method whereby the size of dispersed synthetic rubber particles may be increased without diluting the latex.

By the method of this invention, a water-soluble weak acid is added to the latex, and an ammonium salt of the acid is then formed in situ whereby the size of the particles in the synthetic rubber latex is increased.

As weak acids which may be employed may be mentioned formic acid, acetic acid, carbonic acid, sulfurous acid, and other acids which are only weakly ionized in aqueous solution. These may be added to synthetic rubber latex containing an acid-stable emulsifying agent in considerable quantities without exerting any flocking or coagulating action on the latex, the lack of activity apparently being due to the small number of ions existing in aqueous solutions of the acids.

The latex containing the acid is then treated with ammonia to form an ammonium salt in situ. Because the ammonium salt is strongly ionized, the latex is flocked from its submicroscopic size to an almost uniform particle size of from 0.3 to 0.4 micron. The large reduction in surface area of the latex particles renders available more emulsifying agent per unit area of rubber and accounts for the increased stability of the latex. Since the existence of too large a quantity of ammonium salt in the latex will cause irreversible coagulation, either insufficient acid to form excess ammonium salt should be employed, or the reaction of the ammonia with the acid should be stopped when enough salt is present to effect the desired flocking action. The amount of ammonium salt which can be present without causing irreversible coagulation depends upon a number of factors including the kind and concentration of emulsifying agent, the kind and concentration of synthetic rubber particles, and the pH of the latex.

As a specific example of the method of this invention, a synthetic rubber latex was prepared by the polymerization of a mixture of 55 parts by weight of butadiene and 45 parts of acrylonitrile in the presence of about 5 parts of sodium alkyl benzene sulfonate emulsifying agent. 5.4 parts of 50% acetic acid were stirred into 400 parts of the synthetic rubber latex. The stirring of the latex was continued in such a manner that a vortex was formed in its upper surface. Ammonia gas was then discharged in a gentle stream above the surface of the latex in such a manner that it was absorbed by the latex and reacted with the acetic acid to form ammonium acetate in situ. The absorption of ammonia was continued until the latex exhibited a pH of 9.5, at which time it was found that the particles in the latex were uniformly about 0.4 micron in diameter, and the latex was considerably more stable than the starting material.

The ammonia can be made to react with the acid in other ways, as by merely allowing ammonia gas to stand in contact with the surface of the latex, or by bubbling ammonia diluted with an inert gas such as nitrogen through the latex.

The method of this invention may be applied to dispersions prepared by the polymerization of any butadiene-1,3 such as butadiene-1,3, isoprene, piperylene, 2,3-dimethyl butadiene or chloroprene alone or in admixture with each other and/or monoethylenic monomers copolymerizable therewith in aqueous emulsion such as acrylonitrile, styrene, methyl methacrylate, methyl vinyl ketone, etc. The emulsifying agents should be of such a nature that they are stable in the acidic solution formed when the weak acid is added, and in the alkaline solution which may be formed by the addition of the ammonia. Alkali metal alkaryl sulfonates such as sodium or potassium isopropyl naphthalene sulfonate, sodium lauryl benzene sulfonate, etc., and alkali metal alkyl sulfates such as sodium lauryl sulfate, sodium myristyl sulfate, sodium oleyl sulfate, etc., are examples of such emulsifying agents.

Although I have herein disclosed a specific embodiment of this invention, I do not intend to limit the invention solely thereto for many variations and modifications are within the spirit and scope of the invention as defined in the appended claims.

I claim:

1. The method of treating a synthetic rubber latex prepared by the polymerization of a polymerizable butadiene-1,3 in an aqueous emulsion containing an emulsifying agent, which comprises adding to said latex an amount of a water-soluble weak acid insufficient to coagulate said latex, and reacting the weak acid in the latex with an amount of ammonia sufficient to form an ammonium salt but insufficient to coagulate said latex, the amount of ammonium salt so formed being sufficient to effect an increase in the size of the synthetic rubber particles in the latex and in the stability of the latex but insufficient to cause irreversible coagulation of the latex.

2. The method of treating a synthetic rubber latex prepared by the polymerization of a polymerizable butadiene-1,3 in an aqueous emulsion containing an acid and alkali stable emulsifying agent, which comprises adding to said latex a water-soluble weak acid, and reacting the weak acid in the latex with ammonia to form an amount of ammonium salt sufficient to effect an increase in the size of the synthetic rubber particles in the latex and in the stability of the latex but insufficient to cause irreversible coagulation of the latex.

3. The method of treating a synthetic rubber latex prepared by the polymerization of a mixture of butadiene-1,3 and a lesser amount of a copolymerizable monoethylenic monomer, in an aqueous emulsion containing an acid and alkali stable emulsifying agent, which comprises adding to said latex a water-soluble weak acid and reacting the weak acid in the latex with ammonia to form an amount of ammonium salt sufficient to effect an increase in the size of the synthetic rubber particles in the latex and in the stability of the latex but insufficient to cause irreversible coagulation of the latex.

4. The method of claim 3 in which the water-soluble weak acid is acetic acid.

5. The method of claim 3 in which the copolymerizable monoethylenic monomer is acrylonitrile.

6. The method of claim 3 in which the copolymerizable monoethylenic monomer is acrylonitrile; and the water-soluble weak acid is acetic acid.

7. The method of treating a synthetic rubber latex prepared by the polymerization of a mixture of butadiene-1,3 and a lesser amount of a copolymerizable monoethylenic monomer, in an aqueous emulsion containing an acid and alkali stable emulsifying agent, which comprises adding a water-soluble weak acid to said latex, stirring the latex, and releasing ammonia gas over but near the surface of the stirred latex to form an amount of ammonium salt sufficient to effect an increase in the size of the synthetic rubber particles in the latex and in the stability of the latex but insufficient to cause irreversible coagulation of the latex.

EDWARD A. WILLSON.